Patented June 19, 1923.

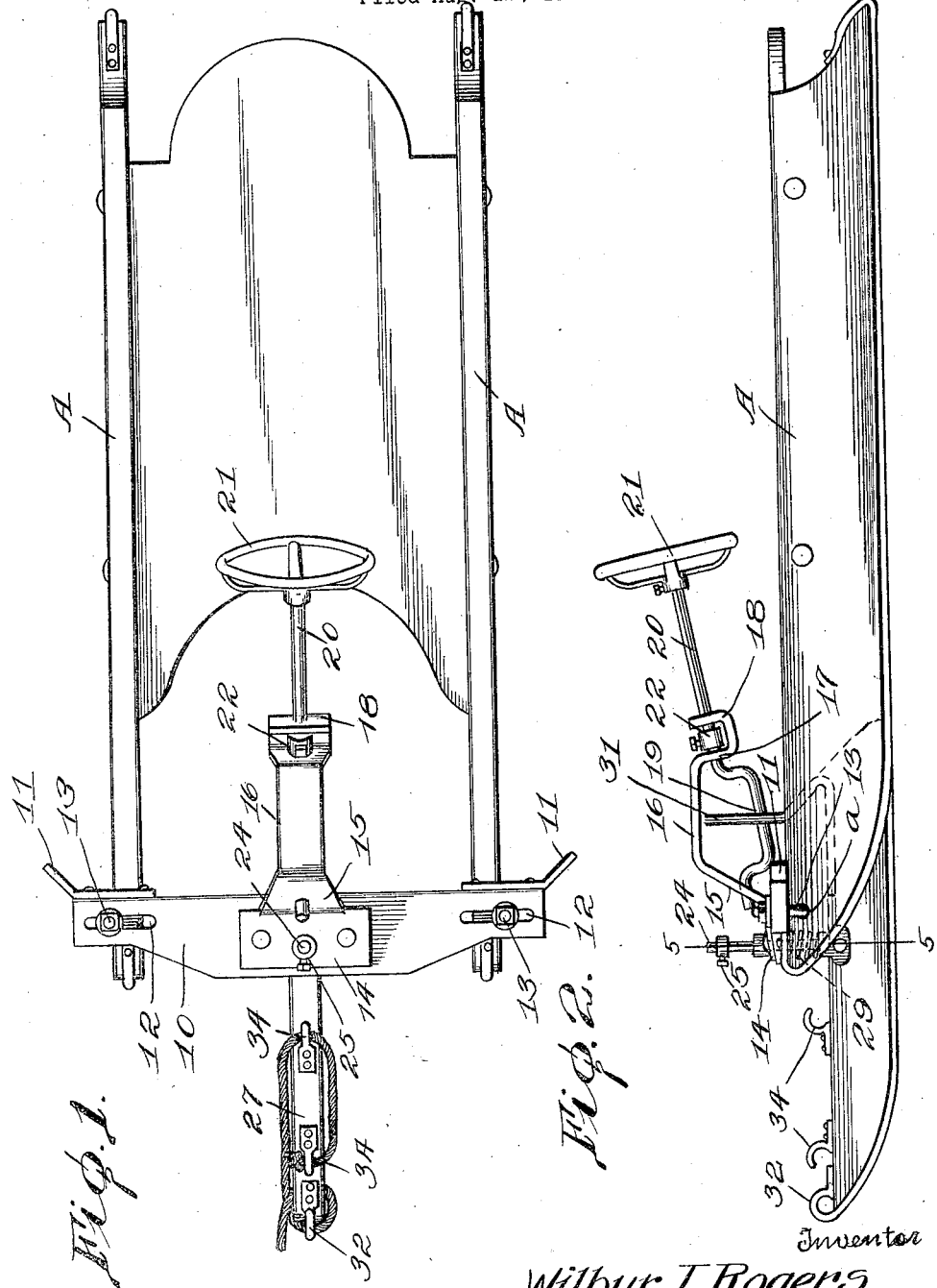

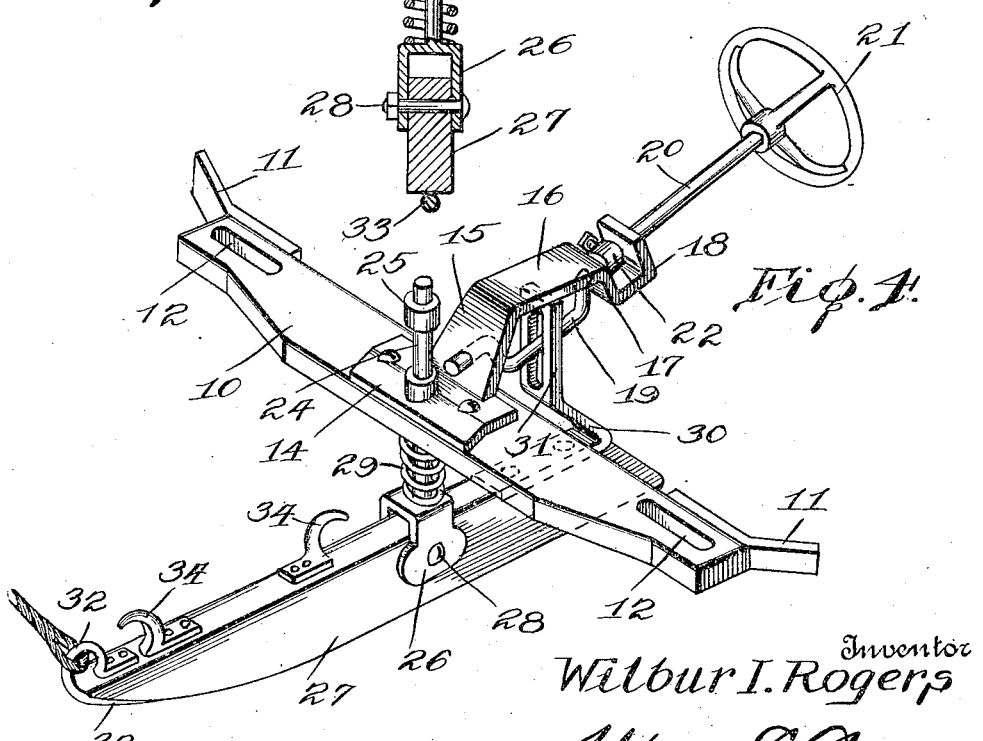

1,459,263

UNITED STATES PATENT OFFICE.

WILBUR I. ROGERS, OF BOSTON, MASSACHUSETTS.

STEERING ATTACHMENT FOR SLEDS.

Application filed August 12, 1922. Serial No. 581,467.

*To all whom it may concern:*

Be it known that I, WILBUR I. ROGERS, a citizen of the United States, residing at Boston, in the county of Suffolk and State of Massachusetts, have invented certain new and useful Improvements in Steering Attachments for Sleds, of which the following is a specification, reference being had to the accompanying drawings.

This invention relates to sleds, and particularly to an attachment which may be readily applied to any ordinary sled whereby the sled may be steered.

The general object of the invention is to provide a device of this character which is very simple, which is so constructed that it may be applied to any ordinarily constructed sled, and which provides means whereby the sled may be directed without difficulty without the necessity of the operator using the toe of his shoe for the purpose of guiding the sled.

A further object is to provide a construction of this character including a steering runner which is adapted to be disposed between and in advance of the ordinary runners of the sled, and provide means whereby this steering runner may be guided, and in this relation to provide a steering runner which is pivotally mounted so that it may be rocked and tipped to any required angle to conform to the ground.

Other objects have to do with the details of construction and arrangement of parts as will appear more fully hereinafter.

My invention is illustrated in the accompanying drawings, wherein:—

Figure 1 is a top plan view of a sled having my attachment applied thereto;

Figure 2 is a side elevation of the sled shown in Figure 1 with the attachment;

Figure 3 is a front end view of the sled with the attachment;

Figure 4 is a perspective view of the attachment by itself;

Figure 5 is a fragmentary sectional view through the forward end of the steering runner and the king bolt.

Referring to the drawings, it will be seen that my attachment comprises a cross piece 10, which at its extremities is provided with laterally projecting foot rests 11 and which is so formed that it may be readily attached to and rest upon the runners A of the ordinary sled. The ends of this cross piece 10 are provided with longitudinally extending slots 12 for use with an elbow or angular bolt 13 whereby the attachment is engaged with the sled runners, as will be later described.

The middle of the cross piece 10 is relatively wide and disposed upon this middle portion adjacent the forward edge thereof is a plate 14, the rear portion of which extends upward and rearward, as at 15, then horizontally rearward, as at 16, then downward, as at 17, rearward and again upward, as at 18. The cranked steering shaft has bearings in these portions 18, 17 and 15. As illustrated, this crank shaft 19 has its forward end rotatably supported in the portion 15, while its rear end is disposed through the flange 17. Extending through the flange 18 is a straight section 20 of the steering shaft which carries the wheel 21, the shaft being held from detachment by means of a collar 22 having a set screw. The plate 14 is formed with an aperture 23, through which passes a king bolt 24, this king bolt having an adjustable collar 25 at its upper end, and the king bolt passes downward through the cross piece 10 and at its lower end has a preferably bifurcated head 26 which embraces a steering runner 27 and which is pinned thereto by a pivot bolt or pin 28. Surrounding the king bolt 24 and bearing at its lower end against the bifurcated head 26 and at its upper end against the under face of the cross piece 10 is a compression spring 29. The pin 28 permits the runner 27 to tip to any degree required and the spring urges the runner downward against the ground.

The rear end of the runner 27 has attached to it an iron 30 formed to provide an upwardly extending slotted yoke 31, and the cranked portion of the shaft 19 operates within this guide yoke. This slotted yoke 31 permits the runner 27 to move up and down in conformity with the contour of the surface over which it is running, while at the same time by oscillating the steering shaft in one direction or the other the runner may be turned upon the pivotal axis formed by the king bolt 24 so as to steer the sled. The forward end of the runner 27 is provided with a hook or eye 32 for the attachment of a rope. This eye may be formed as part of the shoe or blade 33 of the runner or the rope may be attached to the forward end of the runner in any suitable manner.

Preferably two reversely disposed hooks 34 are provided upon the upper face of the runner so that this rope, when not desired for use in drawing the sled, may be partially coiled up upon the upper face of the runner and held in place by the hooks, as illustrated in Figure 1. Each sled runner A is normally made with an aperture $a$ at its forward end in which the draft rope is ordinarily placed. I connect the cross bar 10 to the apertures in the sled runner by means of the angular bolts 13 previously described. One end of each bolt is passed through one of the slots 12, while the other end of the bolt passes through this aperture $a$, and by tightening the nuts on these bolts the cross bar may be held firmly in place.

The operation of this device will be readily understood from what has gone before. The steering runner rocks upon the pivot pin 28 so that it conforms to the contour of the surface over which the sled is passing and at the same time by turning the steering wheel 21 the steering runner may be shifted into any desired angular relation to the longitudinal axis of the sled. The slotted yoke and the loose connection of the king bolt 24 through the plate 14 permits the steering runner to move vertically and to oscillate in a vertical plane, as before described, without in any way affecting the body of the sled. At the same time the spring 29 acts to force the steering runner into engagement with the snow or ice over which the sled is passing. The slots 12 permit the cross bar to be attached to sleds which vary in their distances between the runners.

It will be seen that the device is very simple, that it is thoroughly effective, and that it constitutes a very convenient attachment applicable to ordinary sleds for the purpose of eliminating the necessity of guiding the sled by means of the foot and thereby reducing the wear on shoe leather. It is obvious that minor changes might be made in this construction without departing from the spirit of the invention.

I claim:—

1. A steering attachment for sleds comprising a supporting member having means at its ends whereby it may be attached to the runners of the sled, a king bolt passing vertically through the supporting member and having vertical movement therein, a runner pivotally connected to the king bolt at its lower end for movement in a vertical plane, and means for oscillating the runner in a horizontal plane comprising a crank shaft mounted upon the supporting member and having a depending crank and a steering wheel, and a vertically slotted yoke mounted on the runner through the slot of which the cranked portion of the shaft passes.

2. In a steering attachment for sleds, a cross bar having longitudinally extending slots at opposite ends, angular bolts disposed in said slots, the outer ends of the bolts being adapted to be passed through the runners of a sled, a steering runner mounted beneath the cross bar and upon the same for movement in a vertical plane and oscillation in a horizontal plane, and manually operable means mounted upon the cross bar and engaging the runner rearward of its pivot whereby the runner may be oscillated in a horizontal plane.

3. An attachment for sleds comprising a cross bar, a plate mounted upon the upper ends of the cross bar and having a portion extending upwardly, rearwardly and then downwardly, a steering runner disposed beneath the cross bar, a king bolt, to the lower end of which the runner is pivoted for movement in a vertical plane, the king bolt extending upward through the cross bar and having a stop collar at its upper end, a spring urging the runner downward, a crank shaft having an oscillatory bearing in the rearward extension of said plate, and a yoke mounted upon the rear portion of the steering runner and having a vertical slot through which the cranked portion of the crank shaft passes.

4. A steering attachment for sleds comprising a cross bar having means at its ends whereby it may be detachably engaged with a sled, a plate mounted upon the cross bar and extending upward and rearward, then rearward and downward, rearward and upward, a crank shaft mounted in the downwardly and upwardly extending portions of said extension and having a steering wheel at its rear end, the crank shaft being formed in two sections, a steering runner disposed beneath the cross bar, a king bolt passing through said plate and cross bar and forked at its lower end to embrace the steering runner and pivoted thereto, and a yoke attached to the rear portion of the steering runner and having a vertically slotted portion through which the cranked portion of the shaft passes.

5. A steering attachment for sleds comprising a cross bar having means at its ends whereby it may be detachably engaged with a sled, a plate mounted upon the cross bar and extending upward and rearward, then rearward and downward, rearward and upward, a crank shaft mounted in the downwardly and upwardly extending portions of said extension and having a steering wheel at its rear end, the crank shaft being formed in two sections, a steering runner disposed beneath the cross bar, a king bolt passing through said plate and cross bar and forked at its lower end to embrace the steering runner and pivoted thereto, a yoke attached to the rear portion of the steering runner and having a vertically slotted portion through which the cranked portion of the shaft passes, and a draft connection attached to the forward end of the steering runner, the steering runner being provided with means whereby to hold the draft connection coiled up upon the forward end of the steering runner.

In testimony whereof I hereunto affix my signature.

WILBUR I. ROGERS.